United States Patent Office 3,336,369
Patented Aug. 15, 1967

3,336,369
CATALYTIC CRACKING PROCESS FOR PREPARING N-VINYL-CARBAMIC ACID ESTERS
Wolfram Schwiersch, Frankfurt am Main, and Robert Hartwimmer, Hofheim, Taunus, Germany, assignors to Farbwerke Hoechst Aktiengesellschaft vormals Meister Lucius & Brüning, Frankfurt am Main, Germany, a corporation of Germany
No Drawing. Filed May 4, 1964, Ser. No. 364,806
Claims priority, application Germany, May 11, 1963, F 39,720
3 Claims. (Cl. 260—482)

It is known that N-vinyl-carbamic acid esters can be prepared by addition of alcohols on vinyl-isocyanate (Mh. Chem. 92, 303 (1961) and Makromol. Chem. 31, 230 (1959)) or by transvinylation of carbamic acid esters with alkylvinyl ethers (U.S. Patent No. 3,019,231).

The present invention is based on the observation that N-vinyl-carbamic acid esters of the general formula $$CH_2=CH-N-COOR_2$$
$$\quad\quad\quad\quad\;|$$
$$\quad\quad\quad\quad R_1$$

in which $R_1$ represents a hydrogen atom or an alkyl group containing preferably 1 to 4 carbon atoms, and $R_2$ an alkyl group containing preferably 1 to 4 carbon atoms, can be prepared by catalytic cracking of N-($\alpha$-alkoxyethyl)-carbamic acid esters or N-($\alpha$-alkoxyethyl)-N-alkylcarbamic acid esters by heating them in the presence of surface-active insoluble substances having a weakly acid reaction.

The catalytic cracking of N-($\alpha$-ethoxyethyl)-carbamic acid ethylester in the presence of aluminum oxide which takes place according to the following reaction equation may serve as an example for the reaction according to the process of the present invention:

$$CH_3-CH-NH-COOC_2H_5 \longrightarrow$$
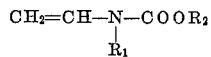

$$CH_2=CH-NH-COOC_2H_5+C_2H_5OH$$

The cracking of N-($\alpha$-isobutoxyethyl)-N-methyl-carbamic acid methylester takes place in analogous manner in the presence of aluminum phosphate:

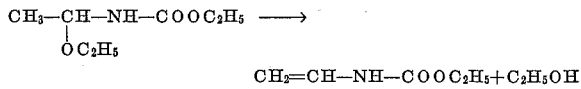

$$CH_2=CH-N-COOCH_3+C_4H_9OH(i)$$
$$\quad\quad\quad\quad\;|$$
$$\quad\quad\quad\quad CH_3$$

As N-$\alpha$-alkoxyethyl-substituted carbamic acid esters capable of being cracked there may be used, according to the process of the present invention, the compounds of the general formula

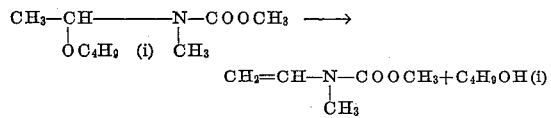

in which R represents an alkyl group containing preferably 1 to 4 carbon atoms, $R_1$ represents a hydrogen atom or an alkyl group, containing preferably 1 to 4 carbon atoms, and $R_2$ represents an alkyl group containing preferably 1 to 4 carbon atoms.

The following compounds may be mentioned as examples for such carbamic acid esters:

N-($\alpha$-methoxyethyl)-carbamic acid ethylester, N-($\alpha$-ethoxyethyl)-carbamic acid ethylester, N-($\alpha$-isobutoxyethyl)-carbamic acid ethylester, N-($\alpha$-methoxyethyl)-carbamic acid n-butylester, N-($\alpha$-ethoxyethyl)-carbamic acid n-butylester, N-($\alpha$-isobutoxyethyl)-carbamic acid n-butylester, N-($\alpha$-isopropoxyethyl)-N-methyl-carbamic acid methylester, N-($\alpha$-isobutoxyethyl)-N-methyl-carbamic acid ethylester and N-($\alpha$-methoxyethyl)-N-butyl-carbamic acid methylester.

The N-$\alpha$-alkoxyethyl-substituted carbamic acid esters used as starting compounds are prepared without difficulty and in very good yields by reacting carbamic acid esters, which carry at least 1 hydrogen atom capable of being substituted on the nitrogen atom, in the presence of acid catalysts with acetals, hemiacetals or acetal-forming components.

As weakly acid, surface-active and insoluble catalysts there may be used, for example, acid aluminum oxides such as acid aluminum oxide according to Woelm (anionotropic), potassium aluminum sulfate or acid aluminum phosphates. Even minor quantities of these substances produce a considerable increase in the speed of decomposition, at the same time reducing the cracking temperature by 60–100° C. on the average. The activity of the catalysts mentioned can be increased by adding small amounts of acid and/or amphoteric oxides of the sub-group elements of the Periodic System, for example, of zirconium dioxide or tungsten oxide. The insolubility required of the catalysts refers to their insolubility in the N-vinyl-carbamic acid esters reacted according to the process of the present invention.

The average catalyst quantity required for the cracking amounts to about 1 to 15 mols percent. After the reaction has taken place, the catalysts used can be recovered in unchanged condition and may therefore be used again. The reaction temperatures to be applied during the cracking can be varied within wide limits and are mainly dependent on type and quantity of the catalyst used and the N-($\alpha$-alkoxyethyl)-carbamic acid ester to be cracked. It is, however, advantageous to use temperatures in the range from 50° to 200° C.

The pressure to be applied during the reaction is chosen so as to ensure that the reaction takes place within the optimum temperature range and that the cracking products can be eliminated at the same time over a separating column.

When carrying out the reaction it is of advantage to introduce the N-$\alpha$-alkoxy compounds together with the catalyst and small amounts of hydroquinone, as stabilizer for the vinyl compound which is obtained as reaction product, into the reaction vessel and to heat up the mixture, while stirring and passing through a stream of nitrogen, if desired under reduced pressure, until the total quantity of the separated alcohol has passed over via a separating column. After the catalyst has been filtered off the reaction mixture is submitted to fractional distillation. In some cases, the fractional distillation may be effected already during the cracking.

Surprisingly, it has been found out that N-($\alpha$-alkoxyethyl)-carbamic acid esters and N-($\alpha$-alkoxyethyl)-N-alkoxy-carbamic acid esters could be converted, in a smooth reaction, in the presence of surface-active, insoluble substances having a weakly acid reaction, into the corresponding N-vinyl-compounds. Acid substances having an acidity which exceeds that of the substances used in the process of this invention, permit the cracking of the carbamic acid esters to take place rapidly, but, in addition, they bring about the polymerization of the N-vinyl-carbamic acid esters formed and thus cause intolerable losses in yield. Alkaline or neutral catalysts either produce no effect at all on the material to be cracked or they provoke reactions with different results.

As compared with known processes, the new process offers the advantage that the starting compounds, which are easily accessible according to a single-stage process, can be converted through the cracking reaction, which has a selective effect, in a smooth reaction and in a good yield, into the N-vinyl compounds. Another advantage consists in the fact that the separate alcohol can be used again for the preparation of the starting compound.

The N-vinyl-carbamic acid esters and N-vinyl-N-alkylcarbamic acid esters obtainable according to the process of the present invention constitute valuable perfumes for the perfume industry. Moreover, they are excellent starting products for homopolymerization and copolymerization.

The homopolymers prepared from these compounds may be used as molded bodies of various kinds and besides serve as gap-filling adhesives and surface coatings.

The copolymers prepared, for example, with vinyl acetate, acrylo-nitrile, methacrylic acid esters, vinyl chloride, acrylic acid and acrylic acid amide from compounds obtained according to the process of the present invention are resin-like products which are used as adhesive substances, molded bodies and surface coatings.

Finally, the polyvinylamines obtained through saponification of the homopolymers can be used as starting material for ion exchangers on the basis of plastics, for the preparation of synthetic fibers of good dyeability which can be spun and hardened in an aqueous solution and as an addition increasing the hygroscopy and dyeability of synthetic fibers. The commonly known salts of these polyamines are suitable, for example, as levelling and stripping agents, finishing and sizing agents, catalysts or buffer substances.

The following examples serve to illustrate the invention but they are not intended to limit it thereto, the parts being by weight unless otherwise stated, and the relationship of parts by weight to parts by volume being the same as that of the kilogram to the liter.

Example 1

7 g. of acid aluminum oxide according to Woelm (anionotropic) and 0.5 g. of hydroquinone, as stabilizer, are added to 161 g. (1 mol) of N-(α-ethoxyethyl)-carbamic acid ethylester which has been introduced into a four-necked flask of 1 liter capacity equipped with a stirrer, a thermometer, a nitrogen inlet tube and a cooler with cooling trap, then the flask is evacuated at a pressure of 45–50 mm. of mercury, nitrogen is passed through the flask and the apparatus slowly heated up while stirring vigorously. At a temperature as low as 88° C. the separation of ethanol sets in and is practically finished after 2½ hours. In the cooling trap there are 42 g. (92% of the theory) of ethanol having a refractive index of $n_D^{20}$:1.3625. In order to eliminate the catalyst the contents of the flask is filtered off with suction and subjected to fractional distillation. At a pressure of 20 mm. of mercury and 86–87° C., 87 g. of N-vinyl-carbamic acid ethylester are obtained, corresponding to 76% of the theoretical yield.

Example 2

378 g. (2 mols) of N-(α-isobutoxyethyl)-N-methyl-carbamic acid methylester are introduced into a four-necked round flask of 1 liter capacity which is equipped with a stirrer, a sump thermometer, a capillary and a short column with attached distilling bridge, and 30.6 g. (15 mols percent) of acid (anionotropic) aluminum oxide according to Woelm are added as cracking catalyst and 0.5 g. of hydroquinone as stabilizer for the vinyl compound. The contents of the flask is heated up to 140–150° C., while stirring vigorously, at the same time the flask is evacuated at a pressure of 140–170 mm. of mercury and nitrogen allowed to stream through the capillary into the apparatus. The total volatile contents of the flask is slowly distilled over, during 6 hours, into a receiver, the pressure being further reduced towards the end of the reaction. Subsequently, the distillate is submitted to fractional vacuum distillation via a 70 cm.-column provided with silver lining and coil packing and separated into its components. There are obtained the following pure compounds:

67.5 g. (0.91 mol) of isobutanol; $n_D^{20}$:1.3989; boiling at 60° C. under a pressure of 90 mm. of mercury;

96.1 g. (0.835 mol) of N-vinyl-N-methyl-carbamic acid methylester boiling at 84–85° C. under a pressure of 90 mm. of mercury; $n_D^{20}$:1.4559.

Besides, 167 g. (0.88 mol) of the starting compound are recovered. From this results a reaction rate of 56% and a yield of 74.5% of the theory.

Analysis.—Calculated: C, 52.2; H, 7.88; N, 12.18. Found: C, 52.7; H, 7.8; N, 12.3.

Example 3

1703 (9 mols) of N-(α-isobutoxyethyl)-N-methyl-carbamic acid methylester are introduced into a four-necked round flask of 4 liters capacity which is equipped with a stirrer, a sump thermometer, a nitrogen inlet tube as well as attached 70 cm.-column with silver lining and coil packing, column head and receiver, then 15 g. of aluminum phosphate are added and the addition of 5 further quantities of 8 g. each is distributed evenly during the reaction time of 6 hours. Consequently, the total quantity of the catalyst amounts to 55 g., which corresponds to 450 mols of aluminum phosphate. The contents of the flask is heated to a sump temperature in the range from 140° to 145° C. and the pressure adjusted to 300 mm. of mercury. It is advantageous to use a silicone oil heating bath with regulated temperature. After some time, a mixture of isobutanol and a vinyl compound having a boiling point of 110–125° C. can be taken off continuously at the head of the column. The reaction is finished after 6 hours and the distillate once more rectified. There are obtained in pure state:

434 g. (5.85 mols) of isobutanol; $n_D^{20}$:1.3982;

575.8 g. (5 mols) of N-vinyl-N-methyl-carbamic acid methylester boiling at 51.8° C. at a pressure of 20 mm. of mercury and having a refractive index of $n_D^{20}$:1.4560.

From the sump are recovered 457 g. (2.42 mols) of N-(α-isobutoxyethyl)-N-methyl-carbamic acid methylester, which has not reacted, boiling at 92° C. at a pressure of 15 mm. of mercury. A polymer residue of 61 g. (0.7 mol) is left which cannot be distilled. These results show that the reaction rate of the cracking amounts to 73%, the yield to 76%.

Example 4

190 g. (1.29 mols) of N-(α-methoxyethyl)-N-methyl-carbamic acid methylester are cracked, as described in Examples 2 and 3, in the presence of 10 g. of a catalyst consisting of 80% of aluminum oxide and 20% of tungsten oxide, at a sump temperature of 100–110° C. and at a pressure of 120–140 mm. of mercury. After 4 hours the cooling trap arranged after the receiver contains 24 g. (0.75 mol) of methanol having a refractive index of $n_D^{20}$: 1.3337. The contents of the receiver is subjected to fractional distillation yielding 68.0 g. (0.59 mol) of N-vinyl-N-methyl-carbamic acid methylester having a refractive index of $n_D^{20}$: 1.4559. 69.7 g. (0.474 mol) of N-(α-methoxyethyl)-N-methyl-carbamic acid methylester having a refractive index of $n_D^{20}$: 1.4200 and a boiling point of 59.2° C. at a pressure of 14 mm. of mercury are recovered as starting compound in unchanged condition. The reaction rate amounts to 63.3%, the yield to 73% of the theory.

Example 5

4 mols (757 g.) of N-(α-isobutoxyethyl)-N-methyl-carbamic acid methylester are introduced into a two-necked flask of 1 liter capacity which is equipped with a column with silver lining and a head and capillary for the superposition of nitrogen and 1 mol percent (2 g.) of a finely pulverized potassium-aluminum sulfate

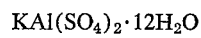

(alum) is added. The mixture is heated to a sump temperature of 135° C. and the cracking products are distilled over in a vacuum at a pressure of 200 mm. of mercury. Within 5 hours, 727 g. of the distillate are gathered in the receiver and should be separated immediately. 269 g. (3.36 mols) of N-vinyl-N-methyl-carbamic acid methylester and 57.2 g. (0.303 mol) of N,O-acetal can be isolated. The reaction rate resulting from this amounts to 92.4%, the yield to 91% of the theory.

We claim:

1. The process for the manufacture of a compound of the formula $$CH_2=CH-N-COOR_2$$
$$\phantom{CH_2=CH-N-}|$$
$$\phantom{CH_2=CH-N-}R_1$$

in which $R_1$ represents a member selected from the group consisting of hydrogen and lower alkyl, and $R_2$ represents lower alkyl, which comprises the catalytic cracking of a compound selected from the group consisting of N(α-alkoxyethyl)-carbamic acid alkylester and N-(α-alkoxyethyl)-N-alkyl-carbamic acid alkylester in the presence at least about 1 to about 15 mol percent of acid aluminum oxide, acid aluminum phosphate or potassium-aluminum sulfate as catalyst at a temperature in the range from about 50° to about 200° C.

2. The process for the manufacture of a compound of the formula $$CH_2=CH-N-COOR_2$$
$$\phantom{CH_2=CH-N-}|$$
$$\phantom{CH_2=CH-N-}R_1$$

consisting of hydrogen and lower alkyl, and $R_2$ represents in which $R_1$ represents a member selected from the group lower alkyl, which comprises catalytic cracking of a compound of the formula $$CH_3-C-\!\!-\!\!-N-COOR_2$$
$$\phantom{CH_3-}|\phantom{-\!\!-\!\!-}|$$
$$\phantom{CH_3-}OR\phantom{-}R_1$$

in which R represents lower alkyl, and $R_1$ and $R_2$ are defined as above, in the presence of a catalyst selected from the group consisting of acid aluminum oxide and acid aluminum phosphate being used in a proportion of from about 1 to about 15 mol percent at a temperature in the range from about 50° to about 200° C.

3. The process as claimed in claim 1, in which the reaction is carried out in the presence of an additional auxiliary catalytic compound selected from the group consisting of zirconium dioxide and tungsten oxide.

References Cited

UNITED STATES PATENTS 3,019,231   1/1962   Peppel et al. _____ 260—482
3,022,337   2/1962   Enk et al. _____ 260—486

LORRAINE A. WEINBERGER, *Primary Examiner.*

ALBERT P. HALLUIN, *Assistant Examiner.*